United States Patent
Hyatt et al.

(10) Patent No.: US 9,441,496 B2
(45) Date of Patent: Sep. 13, 2016

(54) STRUCTURAL GUIDE VANE INTERNAL TOPOLOGY

(71) Applicant: United Technologies Corporation, Hartford, CT (US)

(72) Inventors: Thomas B. Hyatt, Cromwell, CT (US); Carl Brian Klinetob, East Haddam, CT (US); Jason Leroux, Kensington, CT (US)

(73) Assignee: United Technologies Corporation, Hartford, CT (US)

( * ) Notice: Subject to any disclaimer, the term of this patent is extended or adjusted under 35 U.S.C. 154(b) by 720 days.

(21) Appl. No.: 13/712,155

(22) Filed: Dec. 12, 2012

(65) Prior Publication Data

US 2014/0086737 A1 Mar. 27, 2014

Related U.S. Application Data

(60) Provisional application No. 61/705,677, filed on Sep. 26, 2012.

(51) Int. Cl.
*F01D 9/02* (2006.01)
*F01D 5/14* (2006.01)
*F01D 9/04* (2006.01)

(52) U.S. Cl.
CPC .............. *F01D 9/02* (2013.01); *F01D 5/147* (2013.01); *F01D 9/041* (2013.01); *F05D 2230/60* (2013.01); *F05D 2240/12* (2013.01); *F05D 2240/124* (2013.01); *Y02T 50/40* (2013.01); *Y02T 50/671* (2013.01); *Y02T 50/673* (2013.01); *Y10T 29/49323* (2015.01)

(58) Field of Classification Search
CPC ........ F01D 9/04; F01D 9/041; F04D 29/544; F05D 2230/60; F05D 2240/12; F05D 2240/123; F05D 2240/124; Y02T 19/49323; Y02T 50/40
See application file for complete search history.

(56) References Cited

U.S. PATENT DOCUMENTS

| | | | |
|---|---|---|---|
| 4,594,761 A | * | 6/1986 | Murphy ............... B23P 15/04 29/418 |
| 4,802,823 A | | 2/1989 | Decko et al. |
| 4,820,117 A | | 4/1989 | Larrabee et al. |
| 6,764,276 B2 | | 7/2004 | Mulcaire et al. |
| 6,910,860 B2 | | 6/2005 | Glover et al. |
| 7,021,899 B2 | | 4/2006 | Ferte et al. |
| 7,090,463 B2 | | 8/2006 | Milburn et al. |

(Continued)

FOREIGN PATENT DOCUMENTS

JP 2003056497 2/2003

OTHER PUBLICATIONS

International Search Report and Written Opinion for PCT Application No. PCT/US2013/061929 mailed on Dec. 19, 2013.

(Continued)

*Primary Examiner* — Ninh H Nguyen
(74) *Attorney, Agent, or Firm* — Carlson, Gaskey & Olds, P.C.

(57) ABSTRACT

A disclosed structural guide vane for a gas turbine engine includes a strut defining a plurality of channels and a cover attached over the plurality of channels. The strut includes a first side defining a first surface of an airfoil and a second side including a plurality of channels. At least one of the plurality of channels defines a wall thickness of a portion of the first side that varies in a chord wise direction.

16 Claims, 2 Drawing Sheets

(56) References Cited

U.S. PATENT DOCUMENTS

| | | |
|---|---|---|
| 7,334,988 B2 | 2/2008 | Horng et al. |
| 7,607,287 B2 * | 10/2009 | Reba .................. F01D 9/02 |
| | | 415/115 |
| 7,815,417 B2 | 10/2010 | Somanath et al. |
| 8,100,634 B2 | 1/2012 | Evans |
| 8,177,513 B2 | 5/2012 | Shim et al. |
| 2002/0102161 A1 | 8/2002 | Nordhoff |
| 2005/0254955 A1 * | 11/2005 | Helder ................ B23K 20/122 |
| | | 416/233 |
| 2008/0072569 A1 | 3/2008 | Moniz et al. |
| 2008/0159851 A1 * | 7/2008 | Moniz .................. F01D 5/147 |
| | | 415/159 |
| 2008/0159856 A1 | 7/2008 | Moniz et al. |
| 2009/0232657 A1 | 9/2009 | Read et al. |
| 2013/0219922 A1 * | 8/2013 | Gilson .................. F01D 9/041 |
| | | 60/805 |

OTHER PUBLICATIONS

International Preliminary Report on Patentability for PCT Application No. PCT/US2013/061929, mailed Apr. 9, 2015.

* cited by examiner

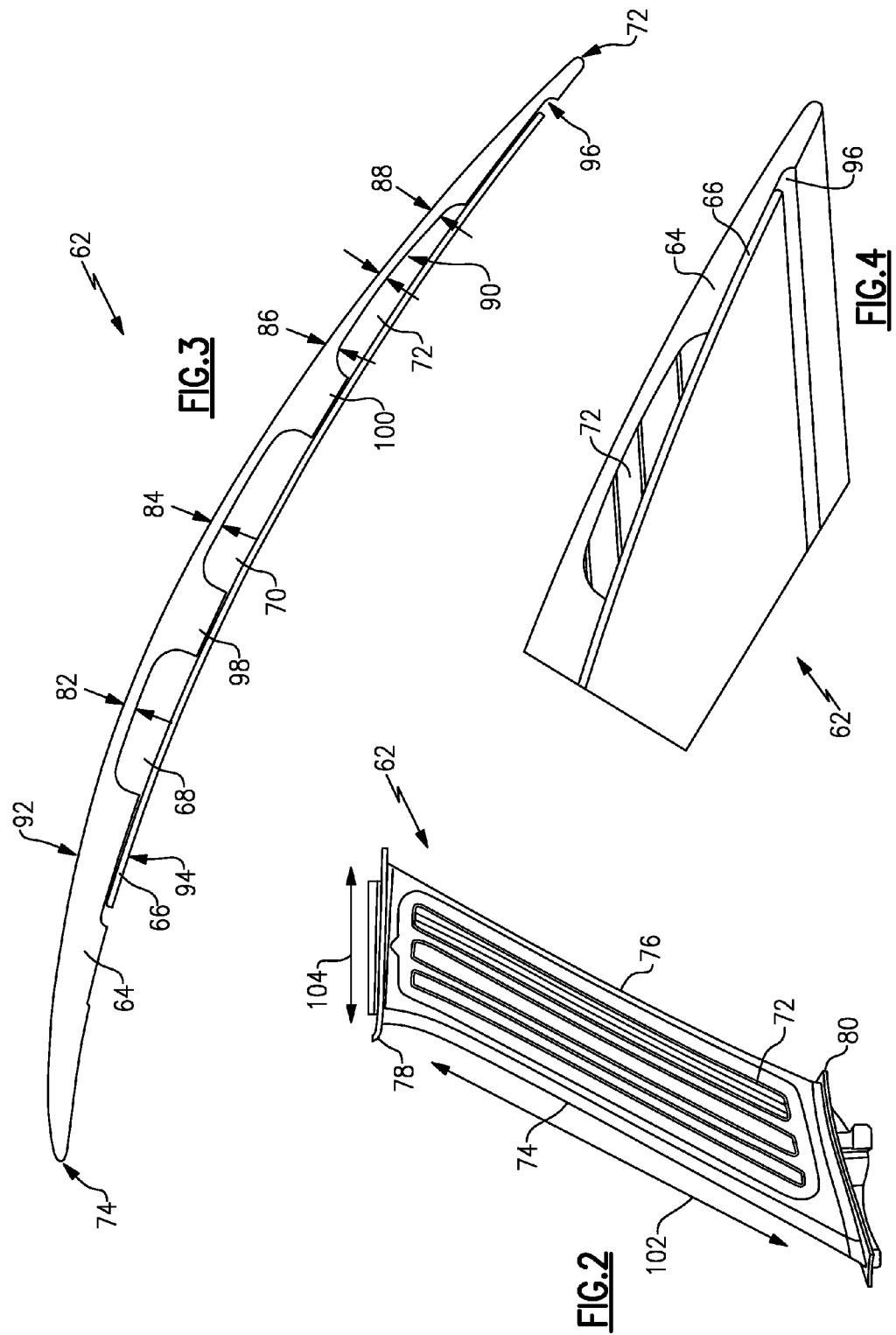

STRUCTURAL GUIDE VANE INTERNAL TOPOLOGY

CROSS REFERENCE TO RELATED APPLICATION

This application claims priority to U.S. Provisional Application No. 61/705,677 filed on Sep. 26, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A bypass passage is defined about the core engine section and can include guide vanes that direct airflow. In some engine configurations, the guide vane is a structural component part of the overall static structure of the gas turbine engine. Structures disposed within the bypass passage and throughout the engine are required to perform within defined limits during an impact scenario. Accordingly, a structural guide vane is required to withstand impacts and still perform within desired limits. However, simply making the guide vane larger or from a heavy material is not desired as the additional weight counteracts other engine efficiency improvements.

Accordingly, turbine engine manufacturers continue to seek further improvements to guide vane structures including improvements to reduce weight while maintain the desired structural performance.

SUMMARY

A gas turbine engine according to an exemplary embodiment of this disclosure, among other possible things includes a fan section including a plurality of fan blades rotatable about an axis, a fan case disposed around the fan section, a core engine section, and at least one structural guide vane extending between the core engine and the fan case. The structural guide vane includes at least one channel including a wall with a first thickness transverse to the axis. The first thickness varies in a chord wise direction.

In a further embodiment of the foregoing gas turbine engine, the at least one channel extends longitudinally in a span wise direction.

In a further embodiment of any of the foregoing gas turbine engines, the structural guide vane includes a cover secured over the at least one channel and defining a side of the structural guide vane.

In a further embodiment of any of the foregoing gas turbine engines, the at least one channel includes a plurality of channels with each channel including a corresponding plurality of walls and each of the plurality of walls includes a thickness different than at least one of the other walls of another of the plurality of channels.

In a further embodiment of any of the foregoing gas turbine engines, the at least one channel includes a trailing edge channel including a forward portion and an aft portion and a wall with a thickness that varies from the forward portion to the aft portion.

In a further embodiment of any of the foregoing gas turbine engines, the wall thickness is smallest at an intermediate point between the forward portion and the aft portion.

In a further embodiment of any of the foregoing gas turbine engines, includes an intermediate portion including a wall thickness that is less than both the forward portion and the aft portion.

A structural guide vane for a gas turbine engine according to an exemplary embodiment of this disclosure, among other possible things includes a strut including a first side defining a first surface of an airfoil and a second side including a plurality of channels. At least one of the plurality of channels defines a wall thickness of a portion of the first side that varies in a chord wise direction. A cover is attached to the second side of the strut for defining a second surface of the airfoil.

In a further embodiment of the foregoing structural guide vane, the plurality of channels includes a forward channel, an intermediate channel and an aft channel with a different wall thickness defined by each of the forward, intermediate and aft channels.

In a further embodiment of any of the foregoing structural guide vanes, the forward channel includes a first wall thickness and the intermediate channel includes a second wall thickness defining a ratio between about 0.80 and about 0.90.

In a further embodiment of any of the foregoing structural guide vanes, the aft channel includes a forward portion wall thickness and an aft portion wall thickness that is different than the forward portion wall thickness.

In a further embodiment of any of the foregoing structural guide vanes, a ratio of the aft portion wall thickness to the forward portion wall thickness is between about 0.78 and about 0.98.

In a further embodiment of any of the foregoing structural guide vanes, the plurality of channels extends span wise within the strut.

In a further embodiment of any of the foregoing structural guide vanes, the strut includes an upper platform and a lower platform with the channels extending between the upper platform and the lower platform.

In a further embodiment of any of the foregoing structural guide vanes, the strut includes a recess on the second side for receiving the cover.

A method of assembling a structural guide vane according to an exemplary embodiment of this disclosure, among other possible things includes forming a strut having a first side defining a first surface of an airfoil and a second side having a plurality of channels separated by a corresponding plurality of ribs. At least one of the plurality of channels includes a wall thickness of the first side that varies in a chord wise direction. A cover is attached to the second side over the plurality of channels.

In a further embodiment of the foregoing method, includes forming a forward channel, an intermediate channel and an aft channel with a different wall thickness in the chord wise direction in each of the forward, intermediate and aft channels.

In a further embodiment of any of the foregoing methods, includes forming the aft channel with a wall thickness that decreases in an aft direction.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a side view of an example structural guide vane.

FIG. 3 is a cross-section of the example structural guide vane.

FIG. 4 is an enlarged cross-section of a channel of the example structural guide vane.

DETAILED DESCRIPTION

Figure 1:
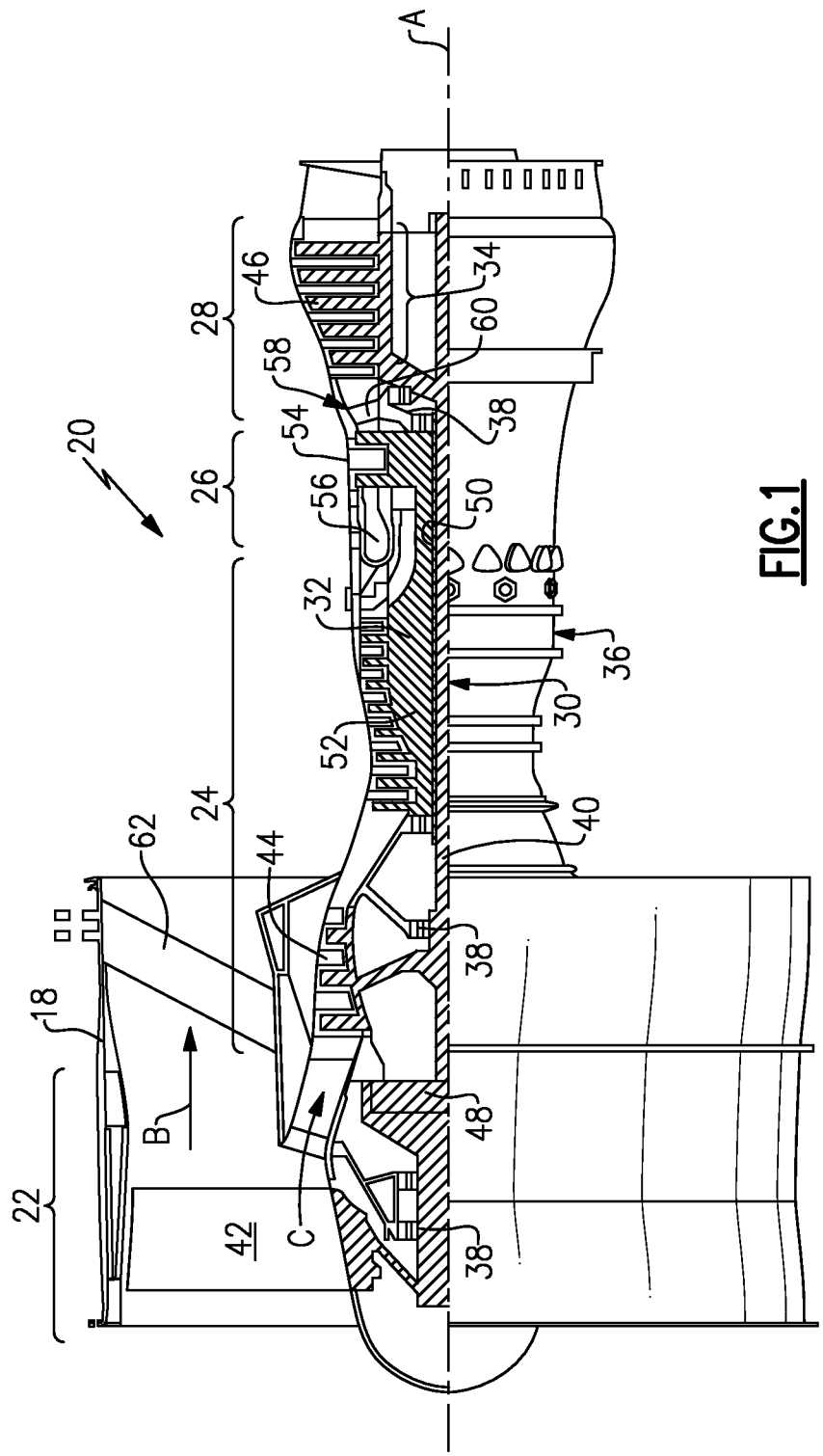
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ("TSFC")"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram } °R)/518.7]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Referring to FIG. 2-4 with continued reference to FIG. 1, a structural guide vane 62 extends radially transverse to the axis A between the core engine static structure 36 and a fan case 18 to provide support and structural rigidity. The structural guide vane 62 is generally shaped as an airfoil and includes suction or first side 92 and a pressure or second side 94 along with a leading edge 74 and trailing edge 76. The example structural guide vane 62 includes a strut 64 that extends radially in a span-wise direction (illustrated by arrow 102) between an upper platform 78 and a lower platform 80.

The example strut 64 defines the first side 92 and includes three cavities or channels 68, 70, 72 that extend longitudinally in the span-wise direction 102 to lighten the entire structure. In this example the channels 68, 70 and 72 are disposed on the second side 94. A cover 66 is disposed within a recess 96 and over the channels 68, 70, and 72 on the second side 94 of the guide vane 62. The cover 66 is adhered or otherwise attached to the strut 64 to cover the channels 68, 70 and 72 to maintain the desired aerodynamic properties and performance of the vane 62.

The channels 68, 70 and 72 extend radially between the upper platform 78 and the lower platform 80 (Best shown in FIG. 1). Ribs 98, 100 are disposed between corresponding channels 68, 70 and 72 to provide structural rigidity to the strut 64.

Dynamic loads and impact performance are factors considered in the configuration of the example structural guide vane 62. The example structural guide vane 62 is a primary load path and therefore includes features reducing high stress concentrations without the addition of weight. The example strut 64 includes a localized non-uniform wall thickness for distributing loads and alleviating high stress areas.

Each of the channels 68, 70, and 72 include a corresponding wall thickness between a bottom surface of the channels and the first side 92. The wall thickness of each of the channels 68, 70, and 72 varies between cavities. The channels 68, 70, and 72 include the forward channel 68, intermediate channel 70 and aft channel 72. The forward channel 68 includes a thickness 82 and the intermediate cavity 70 includes a second thickness 84 that is different than the first thickness 82 in this example. In this example the first thickness 82 is greater than the second thickness 84.

The example first thickness 82 is related to the second thickness 84 to define a geometry that provides the desired low stress and high impact resistance. In this example a ratio of the second thickness 84 to the first thickness 82 is between about 0.80 and 0.090. The difference in thickness further aids in tuning the resonant frequency of the guide vane 62.

The aft channel 72 includes a tapered surface 90 that is tapered in a chord wise direction 104. The tapered surface 90 includes an initial or forward portion wall thickness 86 at a forward most portion of the channel 72 and an aft portion wall thickness 88 at an aft most portion of the aft channel 72. The forward portion wall thickness 86 is greater than the aft portion wall thickness 88 and defines a decreasing wall thickness of the strut 64 in the localized area near the trailing edge 76. The tapered wall thickness provided by the tapered surface 90 defines a localized geometry that, as indicated, improves impact resistance while also reducing high stress areas. Although the example aft channel 72 includes the tapered surface 90, the other channels may also include a tapered surface.

In a disclosed example, the aft portion wall thickness 88 is related to the forward portion wall thickness 86 according to a ratio between about 0.78 and about 0.98. As indicated, the decrease in thickness of the skin provides a desired impact resistance, structural rigidity and maintains the weight saving benefits of including the span wise extending channels 68, 70, and 72.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
   a fan section including a plurality of fan blades rotatable about an axis;
   a fan case disposed around the fan section;
   a core engine section; and
   at least one structural guide vane extending between the core engine and the fan case, the structural guide vane including at least two channels, wherein each of the channels includes a wall thickness transverse to the axis, wherein the wall thickness in one of the at least two channels is different than at least one wall thickness of another of the at least two channels and the at least two channels include a trailing edge channel including a forward portion and an aft portion and a wall with a thickness that varies from the forward portion to the aft portion.

2. The gas turbine engine as recited in claim 1, wherein the at least two channels extend longitudinally in a span wise direction.

3. The gas turbine engine as recited in claim 1, wherein the structural guide vane includes a cover secured over the at least two channels and defining a side of the structural guide vane.

4. The gas turbine engine as recited in claim 1, wherein the wall thickness is smallest at an intermediate point between the forward portion and the aft portion.

5. The gas turbine engine as recited in claim 1, including an intermediate portion including a wall thickness that is less than both the forward portion and the aft portion.

6. A gas turbine engine comprising:
   a fan section including a plurality of fan blades rotatable about an axis;
   a fan case disposed around the fan section;
   a core engine section; and
   at least one structural guide vane extending between the core engine and the fan case, the structural guide vane including at least one channel including a wall with a first thickness transverse to the axis, wherein the first thickness varies in a chord wide direction, wherein the at least one channel includes a plurality of channels with each channel including a corresponding plurality of walls and each of the plurality of walls includes a thickness different than at least one of the other walls of another of the plurality of channels.

7. A structural guide vane for a gas turbine engine comprising:

a strut including a first side defining a first surface of an airfoil and a second side including a plurality of channels, wherein at least one of the plurality of channels defines a wall thickness of a portion of the first side that varies in a chord wise direction; and a cover attached to the second side of the strut for defining a second surface of the airfoil, wherein the strut includes a recess on the second side for receiving the cover.

8. The structural guide vane as recited in claim 7, wherein the plurality of channels includes a forward channel, an intermediate channel and an aft channel with a different wall thickness defined by each of the forward, intermediate and aft channels.

9. The structural guide vane as recited in claim 8, wherein the forward channel includes a first wall thickness and the intermediate channel includes a second wall thickness defining a ratio between about 0.80 and about 0.90.

10. The structural guide vane as recited in claim 8, wherein the aft channel includes a forward portion wall thickness and an aft portion wall thickness that is different than the forward portion wall thickness.

11. The structural guide vane as recited in claim 10, wherein a ratio of the aft portion wall thickness to the forward portion wall thickness is between about 0.78 and about 0.98.

12. The structural guide vane as recited in claim 7, wherein the plurality of channels extends span wise within the strut.

13. The structural guide vane as recited in claim 7, wherein the strut includes an upper platform and a lower platform with the channels extending between the upper platform and the lower platform.

14. A method of assembling a structural guide vane comprising:

forming a strut having a first side defining a first surface of an airfoil and a second side having a plurality of channels separated by a corresponding plurality of ribs, wherein at least one of the plurality of channels includes a wall thickness of the first side that varies in a chord wise direction, wherein a wall thickness in at least one of the plurality of channels is different than a wall thickness in at least one other of the plurality of channels;

forming a recess on the second side of the strut; and attaching a cover to the second side over the plurality of channels and received within the recess formed on the second side.

15. The method as recited in claim 14, including forming a forward channel, an intermediate channel and an aft channel with a different wall thickness in the chord wise direction in each of the forward, intermediate and aft channels.

16. The method as recited in claim 15, including forming the aft channel with a wall thickness that decreases in an aft direction.

* * * * *